United States Patent [19]

Johnson

[11] Patent Number: 5,420,592

[45] Date of Patent: May 30, 1995

[54] SEPARATED GPS SENSOR AND PROCESSING SYSTEM FOR REMOTE GPS SENSING AND CENTRALIZED GROUND STATION PROCESSING FOR REMOTE MOBILE POSITION AND VELOCITY DETERMINATIONS

[75] Inventor: Russell K. Johnson, Half Moon Bay, Calif.

[73] Assignee: Radix Technologies, Inc., Mountain View, Calif.

[21] Appl. No.: 42,551

[22] Filed: Apr. 5, 1993

[51] Int. Cl.6 .......................... H04B 7/185; G01S 5/02
[52] U.S. Cl. ...................................................... 342/357
[58] Field of Search ........................................... 342/357

[56] References Cited

U.S. PATENT DOCUMENTS

| | | | |
|---|---|---|---|
| 5,119,102 | 6/1992 | Barnard | 342/357 |
| 5,185,610 | 2/1993 | Ward et al. | 342/357 |
| 5,323,322 | 6/1994 | Mueller et al. | 364/449 |
| 5,347,285 | 9/1994 | MacDoran et al. | 342/357 |

Primary Examiner—Theodore M. Blum
Attorney, Agent, or Firm—Thomas E. Schatzel

[57] ABSTRACT

A rawinsonde system embodiment of the present invention includes a digital GPS snapshot buffer and a serial communications controller for transmitting message frames formed of a combination of digital GPS data from the snapshot buffer and digitized hardwired meteorological data input from a humidity-temperature-pressure instrument. The message frames are telemetered at a relatively low rate over a meteorological radio band to a ground station. Substantially all of the conventional GPS digital signal processing is performed by the ground station, including carrier recovery, PRN code locking, pseudo-range extraction, ephemeris data extraction, almanac collection, satellite selection, navigation solution calculation and differential corrections. Ground processing further includes Kalman filter wind velocity calculation.

12 Claims, 3 Drawing Sheets

SEPARATED GPS SENSOR AND PROCESSING SYSTEM FOR REMOTE GPS SENSING AND CENTRALIZED GROUND STATION PROCESSING FOR REMOTE MOBILE POSITION AND VELOCITY DETERMINATIONS

BACKGROUND OF THE INVENTION

1. Field of the Invention

The present invention relates generally to global positioning system (GPS) equipment and methods, and more particularly to separating GPS receiver front-ends from GPS processing such that the GPS front-ends may be placed in expendable launch vehicles, such as radiosondes and sonobuoys.

2. Description of the Prior Art

Weather balloons typically carry aloft radio transmitters that broadcast humidity, temperature and atmospheric pressure at various altitudes of a flight. Such instruments are called radiosondes, and when tracked by transducers to gauge wind velocities, the radiosondes are referred to as rawinsondes. Balloon launched rawinsondes (sondes) are used throughout the world on test ranges to measure and radio-telemeter the balloon's position, altitude, upper atmosphere wind velocities, air temperature, relative humidity and barometric pressure. Such data supports meteorological reporting for the National Weather Service and is used on Department of Defense (DOD) test ranges to validate vehicle wind load limits on days scheduled for launches.

The prior art measures balloon position using several techniques, e.g., a transponder and radiotheodolite, long range navigation (LORAN) and OMEGA, none of which are capable of precise altitude and latitude/longitude resolutions. The radiotheodolite technique requires manning of ground equipment. OMEGA has poor geo-location capability. The reliable reception range of LORAN-C navigation data can be reduced by hundreds of miles during thunderstorm activity. Rain showers, wet fog and snow flurries along a LORAN-C chain can produce "precipitation static" which degrades LORAN-C reception. External man-made interference is also a problem at the 100 KHz frequency used by LORAN-C, due to the long range propagation characteristics of such low frequency signals.

Among existing long range navigational aids, OMEGA, LORAN, TRANSIT and global positioning system (GPS), the GPS system obtains the best accuracies. GPS signals are inherently immune to interference, in part due to its direct sequence, spread spectrum, signal structure and a line-of-sight radio signal propagation characteristic of the two GPS satellite's carrier frequency signals, L1 and L2. Code division multiple access (CDMA) is used to separate signals from the individual GPS satellites. Each GPS satellite transmits a pseudo-random number (PRN) key that is needed by the receiver to decipher information. The L1 GPS band at 1,575.42 MHz, also provides a degree of immunity to terrestrial signals at long ranges, which are over-the-horizon. The GPS L1 C/A signal occupies slightly less than two MHz of bandwidth. The accuracies needed in rawinsonde applications can be obtained worldwide with GPS. Positional accuracies on the order of fifteen meters are possible when using a differentially corrected C/A signal during periods the DOD has engaged a deliberate dither called Selective Availability (SA). Under normal operating conditions, the DOD introduces errors via SA into the GPS system so that unauthorized receivers cannot use the GPS system at its most precise levels of accuracy against the United States or its armed forces in military actions.

In conventional GPS receivers, navigation signals are continuously processed in real-time. A conventional GPS receiver tracks a plurality of PRN phases corresponding to multiple GPS satellites, all in real-time. The ephemeris and catalog data are also extracted in real-time. GPS ephemeris data informs a GPS digital signal processor of the precise orbit of a corresponding GPS satellite. Such real-time, wide-bandwidth tracking of multiple satellites necessitates sophisticated and complex hardware and software.

A major drawback to GPS systems, however, are their cost. Such systems are too expensive to be considered disposable or expendable. It would be prohibitively expensive to most weather data gathering institutions to fly a complete GPS receiver aboard a non-recoverable sonde. The same is true for sonobuoy launchings. GPS receivers are expensive because of the complex signal processing required to extract the positional data from the GPS signal.

One approach to making GPS systems affordable in launch vehicles, e.g., rawinsondes and sonobuoys, is to concentrate the overall system costs in the centralized ground processing equipment. A rawinsonde or sonobuoy could be adapted to relay the raw GPS signals it receives over a radio band, e.g., 1600 MHz or 400–406 MHz which are reserved for meteorological use. Relaying uncorrelated GPS signals to a ground station for GPS processing there would involve a minimum of equipment in the launch vehicle. But a two MHz downlink channel, for example, in the meteorological band, would be needed and would be susceptible to interference. This technique would also require a relatively high power relay transmitter due to the inherent wide bandwidths of the GPS signals and their CDMA spread spectrum modulation.

SUMMARY OF THE INVENTION

It is therefore an object of the present invention to provide a radiosonde with GPS-based position and altitude determinations.

It is a further object of the present invention to provide a GPS-based positioning system with an expendable GPS front-end for use in a remote sensor.

Briefly, a rawinsonde embodiment of the present invention includes a digital GPS snapshot buffer, a serial communications controller for transmitting message frames formed of a combination of digital GPS data from the snapshot buffer and digitized hardwired meteorological data input from a humidity-temperature-pressure instrument. The message frames are telemetered at a relatively low rate over a meteorological band to a ground station. Substantially all of the conventional GPS digital signal processing is performed by the ground station. Such processing traditionally includes carrier recovery, PRN code locking, pseudo-range extraction, ephemeris data extraction, almanac collection, satellite selection, navigation solution calculation and differential corrections. Ground processing further includes Kalman filter wind velocity calculation. The GPS signal is buffered and processed by the ground station in pseudo real-time by a commercially-available microcomputer platform. A digital signal processing accelerator card is included in the computer to improve system throughput such that balloon navigational fixes may be determined at least once a second.

An advantage of the present invention is that a system is provided in which the user clock bias between snapshot collections of GPS data is coherent, thus permitting a single GPS satellite's range data to be used in the Kalman filter to update position information for the GPS front-end.

An advantage of the present invention is that a rawinsonde system is provided in which SA errors are dramatically reduced by employing differential corrections.

Another advantage of the present invention is that a rawinsonde system is provided that has a differential operating mode, wherein a ground processor provides its own self-generated differential corrections. The system computes ranges to each of the GPS satellites from a separate set of GPS signals received directly by the ground processor. It then generates pseudo-range errors based on a known, previously surveyed position, from the computed pseudo-ranges (PR). These ground based PR error terms are then subtracted from the calculated balloon PR measurements to fine tune the airborne GPS measurements. This technique cancels several error sources, including selective availability and atmospheric propagation delays.

A further advantage of the present invention is that a one-bit analog-to-digital converter is provided that insures low manufacturing costs and maintains a high level of performance that is consistent with the rawinsonde mission. The single-bit nature of the digitization has the advantages of requiring only a low-cost comparator, the GPS receiver front-end need not employ automatic gain control, the GPS front-end amplifiers can be simple limiting amplifiers and only 4K bytes of buffer memory is required aboard the rawinsonde.

These and other objects and advantages of the present invention will no doubt become obvious to those of ordinary skill in the art after having read the following detailed description of the preferred embodiment which is illustrated in the various drawing figures.

IN THE DRAWINGS

DETAILED DESCRIPTION OF THE PREFERRED EMBODIMENT

Figure 1:
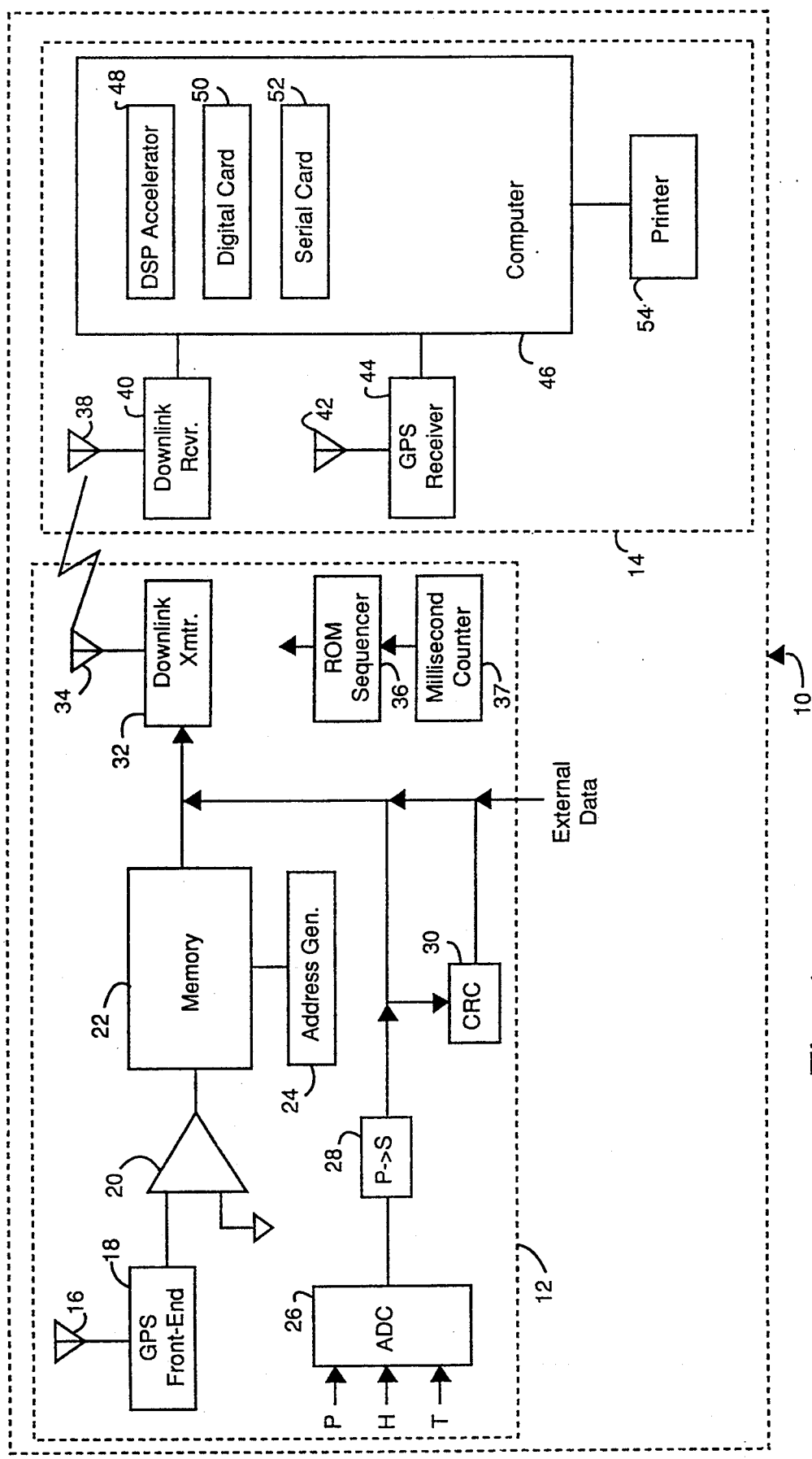
FIG. 1 is a block diagram of a rawinsonde system embodiment of the present invention.

A meteorological measurement system embodiment of the present invention, referred to herein by general reference numeral 10, is illustrated in FIG. 1. System 10 comprises an airborne rawinsonde 12 for attachment to a weather balloon, and a ground station 14. The present invention is not limited to weather balloon applications, and practically any remote sensor requiring accurate position determination and expandability can benefit, e.g., sonobuoys. Airborne rawinsonde 12 includes a GPS antenna 16; a GPS front-end 18; a comparator 20; a memory 22; a memory address generator 24; an analog-to-digital converter (ADC) 26 that receives a set of meteorological input signals related to atmospheric pressure (P), relative humidity (H) and air temperature (T); a parallel to serial converter 28; a cyclic redundancy code (CRC) generator 30; a meteorological band frequency shift keyed (FSK) radio transmitter 32; a transmitter antenna 34 and a read only memory (ROM) sequencer and address generator 36. The GPS antenna 16 is preferably a right-hand, circular polarized (RHCP) GPS patch antenna.

A millisecond counter 37 paces the ROM sequencer 36 to provide coherency to the user clock bias. In other words, the starting points of collection and transmission of data from rawinsonde 12 to ground station 14 (data "snap-shots") are synchronized to occur, as near as is practical, on the same exact points of whole integer millisecond periods. Each millisecond period represents a GPS epoch in which the pseudo random number (PRN) code is repeated. The maintenance of the user clock bias coherence from measurement to measurement permits a more effective application of an extended Kalman filter in centralized ground station processing.

The ground station 14 comprises a meteorological band receiver antenna 38, a meteorological band receiver 40, a GPS antenna 42, a GPS receiver 44, a personal computer (PC) 46, a digital signal processing (DSP) accelerator 48, a digital card 50, an "RS-422" type serial interface card 52 and a printer 54. PC 46 may comprise a commercially available microcomputer system with a hard disk, a keyboard and a monitor, such as the Macintosh IIfx, as marketed by Apple Computer Corporation (Cupertino, Calif.).

Figure 2:
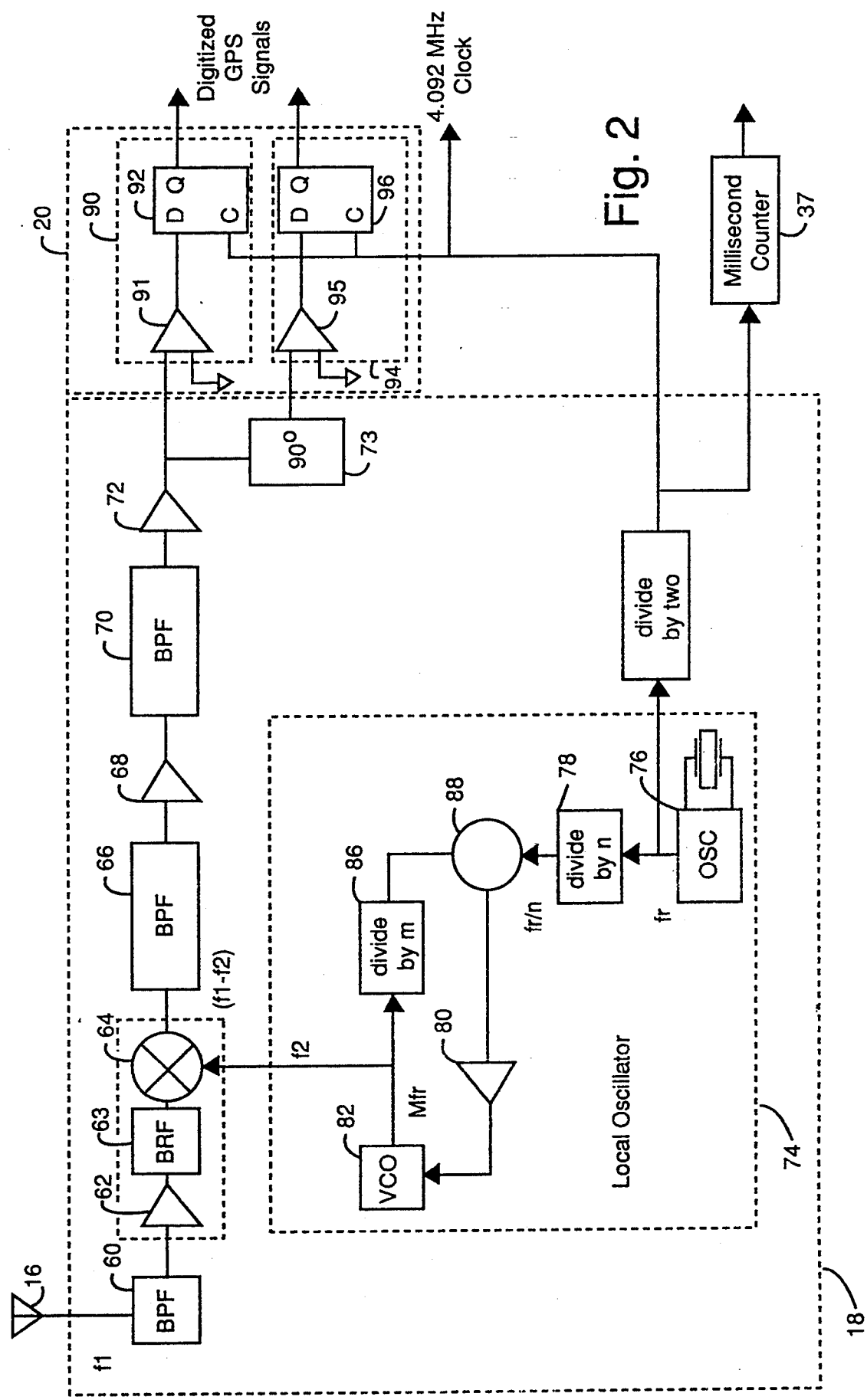
FIG. 2 is a block diagram of a GPS front-end, a local oscillator and a dual single-bit digitizer included in the system of FIG. 1.
Figure 3:
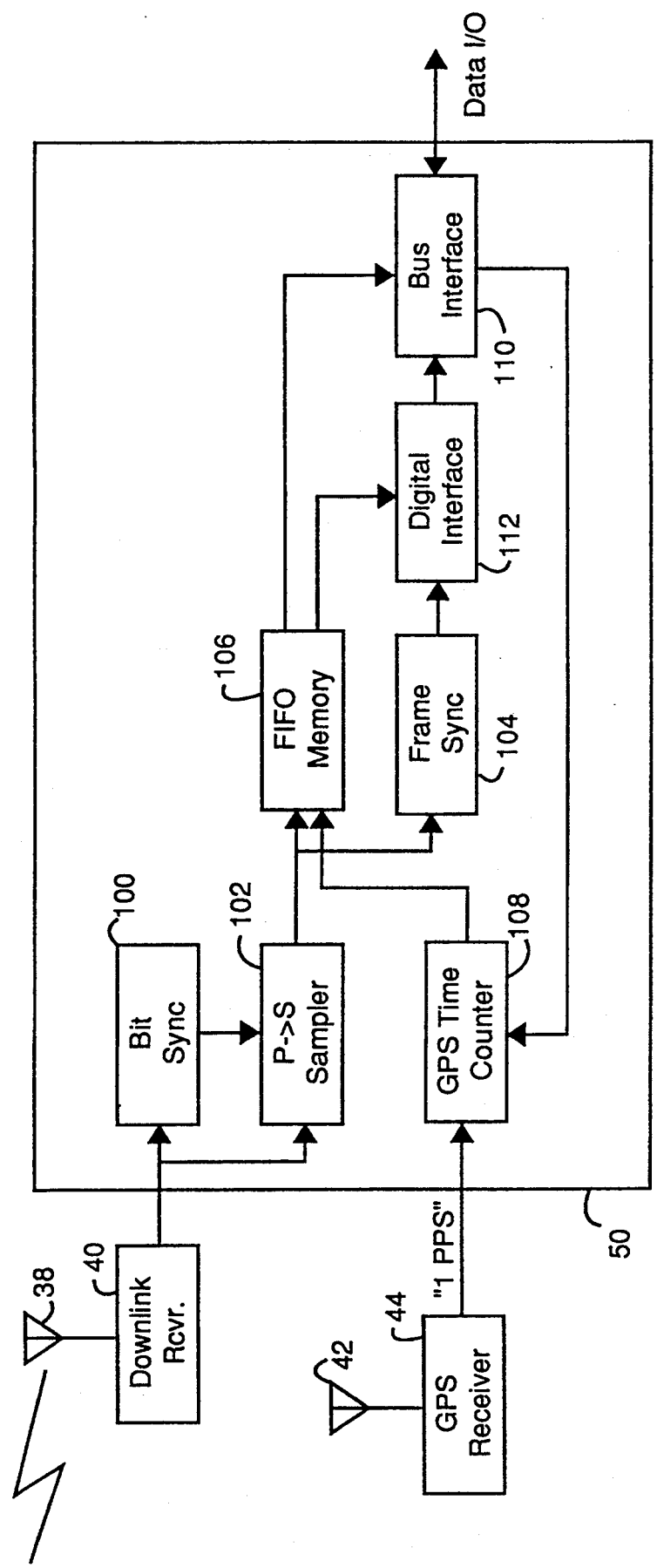
FIG. 3 is a block diagram of a digital card for time tagging messages that is included in the system of FIG. 1.

FIG. 2 shows that GPS front-end 18 includes a 1575.42 MHz bandpass filter (BPF) 60 with a bandwidth of ten MHz, a radio frequency (RF) amplifier 62, a band reject filter (BRF) 63 with a notch frequency of 1509.948 MHz, a mixer 64, a first 32.736 MHz bandpass filter (BPF) 66 with a bandwidth of 1.3 MHz, a first intermediate frequency (IF) amplifier 68, a second 32.736 MHz bandpass filter (BPF) 70 with a bandwidth of 1.3 MHz, a second IF amplifier 72 and a 90° phase shifter 73. A local oscillator (LO) 74 comprises a 8.184 MHz crystal oscillator (OSC) 76, a divide-by-eight circuit 78, a phase lock loop (PLL) amplifier 80, a 1542.684 MHz voltage-controlled oscillator (VCO) 82, a frequency divider 86 nominally programmed to divide by 1508 and a phase comparator 88. Comparator 20 has an in-phase (I) digitizer 90 that includes a comparator 91 and a D-type latch 92. Comparator 20 further has a quadrature-phase (Q) digitizer 94 that includes a comparator 95 and a D-type latch 96.

Preferably, the user clock bias between snap-shot collections of data from rawinsonde 12 is coherent. Although four milliseconds of down-converted GPS signal data is typically collected each second, the start of each collection is substantially exactly an integer number of millisecond "epochs" from corresponding previous starting points of collection. This then allows the collected data to be processed by an extended Kalman filter in ground station 14. Such a Kalman filter allows averaging, regardless of unavoidable balloon pendulum motion that can limit low-elevation GPS satellite visibility at any one instant. Therefore, navigation updates are possible when less than a full constellation of four GPS satellites is available. The Kalman filter provides mathematically optimal updates from the available information, because a Kalman filter's "time constant" may be varied. The Kalman filter also permits the input of a current pseudo range signal-to-noise ratio. Whenever the user clock bias is not coherent between measurements, measurements from at least four GPS satellites are required to update the position of rawinsonde 12.

In operation, only a very short snap-shot of a GPS signal is actually required to locate the position of a balloon carrying rawinsonde 12, e.g., two to four milliseconds per measurement. During each collection period, a "snap-shot" of 32,000 bits of data may be collected and stored by rawinsonde 12. This data is preferably collected at precise integer number of millisecond points from a previous collecting. Since the GPS coarse acquisition (C/A) code repeats each millisecond, this generates user clock bias coherency between snap-shots, which allows the use of an extended Kalman filter to process the data. This data is then transmitted to ground station 14 periodically in a one second interval within a thirty-two KHz channel located in the meteorological radio frequency band. Fast correlation techniques are used to extract pseudo-ranges from GPS signal collection segments. Fast correlation differs from conventional delay lock loop techniques in tracking a GPS signal in that fast Fourier transforms are used to compute all correlation lags for initial lock-on.

Within PC 46, a set of navigational algorithms take the measured pseudo-ranges to as many as four satellites, and generates the user x, y and z Earth Centered Earth Fixed (ECEF) coordinates. A conversion of the ECEF coordinates is made to WGS-84 Earth ellipsoid latitude, longitude and altitude. With the user's estimated x, y and z position denoted as (Ux, Uy, Uz), the four satellite pseudo-ranges denoted as ($r_1$, $r_2$, $r_3$, $r_4$), the $i^{th}$ satellites x, y and z, ECEF coordinates represented as ($S_{xi}$, $S_{yi}$, $S_{zi}$), and B representing the user clock bias, the pseudo-ranges to each of the four satellites may be expressed as follows:

$$r_1 = \sqrt{(S_{x1} - U_x)^2 + (S_{y1} - U_y)^2 + (S_{z1} - U_z)^2} + B, \quad (1)$$

$$r_2 = \sqrt{(S_{x2} - U_x)^2 + (S_{y2} - U_y)^2 + (S_{z2} - U_z)^2} + B,$$

$$r_3 = \sqrt{(S_{x3} - U_x)^2 + (S_{y3} - U_y)^2 + (S_{z3} - U_z)^2} + B,$$

and $$r_4 = \sqrt{(S_{x4} - U_x)^2 + (S_{y4} - U_y)^2 + (S_{z4} - U_z)^2} + B.$$

The $r_i$ are pseudo-ranges in that they each are a sum of the actual ranges plus an offset due to a user clock bias. Equation (1) may be written in a more compact form as follows, $$r_i = \sqrt{(S_{xi} - U_x)^2 + (S_{yi} - U_y)^2 + (S_{zi} - U_z)^2} + B. \quad (2)$$

In practice, a user has only an estimate of an actual position. The estimated pseudo-ranges are denoted $r_{ei}$ and are calculated based on an estimated user location ($U_{ex}$, $U_{ey}$, $U_{ez}$). The estimated pseudo-range may be expressed as, $$r_{ei} = \sqrt{(S_{xi} - U_{ex})^2 + (S_{yi} - U_{ey})^2 + (S_{zi} - U_{ez})^2} + B_e. \quad (3)$$

An alternative, and less preferable, non-Kalman filter navigation algorithm adjusts its estimate of a user position in such a manner as to reduce any error between a measured and an estimated pseudo-range. The error terms may be represented as, $$e_i = r_i - r_{ei}. \quad (4)$$

Such an algorithm will adjust ($U_{ex}$, $U_{ey}$, $U_{ez}$) so as to drive an error term described by equation (4) towards zero. Let $\delta e_i$ be a change in an error term generated by a change in estimated user position. A relation between the change in estimated user position and the change in the error term may be expressed using a total differential. An analytic expression for the total differential is, $$\delta e_i = \frac{\partial e_i}{\partial x} \delta U_{ex} + \frac{\partial e_i}{\partial y} \delta U_{ey} + \frac{\partial e_i}{\partial z} \delta U_{ez} + \frac{\partial e_i}{\partial B_e} \delta B_e. \quad (5)$$

To adjust an estimated user position such that the total error in pseudo-range is zero, $$e_i + \delta e_i = 0. \quad (6)$$

Equation (5) may be expressed in a matrix form as follows, $$\begin{bmatrix} \delta e_1 \\ \delta e_2 \\ \delta e_3 \\ \delta e_4 \end{bmatrix} = \begin{bmatrix} \frac{\partial e_1}{\partial x} & \frac{\partial e_1}{\partial y} & \frac{\partial e_1}{\partial z} & \frac{\partial e_1}{\partial B_e} \\ \frac{\partial e_2}{\partial x} & \frac{\partial e_2}{\partial y} & \frac{\partial e_2}{\partial z} & \frac{\partial e_2}{\partial B_e} \\ \frac{\partial e_3}{\partial x} & \frac{\partial e_3}{\partial y} & \frac{\partial e_3}{\partial z} & \frac{\partial e_3}{\partial B_e} \\ \frac{\partial e_4}{\partial x} & \frac{\partial e_4}{\partial y} & \frac{\partial e_4}{\partial z} & \frac{\partial e_4}{\partial B_e} \end{bmatrix} \begin{bmatrix} \delta U_{ex} \\ \delta U_{ey} \\ \delta U_{ez} \\ \delta B_e \end{bmatrix}. \quad (7)$$

Evaluating each of the partial derivatives using equations (4) and (1) yields, $$\frac{\partial e_i}{\partial x} = -\frac{S_{xi} - U_{ex}}{d_{ei}}, \quad (8)$$

$$\frac{\partial e_i}{\partial y} = -\frac{S_{yi} - U_{ey}}{d_{ei}}, \quad (9)$$

$$\frac{\partial e_i}{\partial z} = -\frac{S_{zi} - U_{ez}}{d_{ei}}, \quad (10)$$

$$d_{ei} = \sqrt{(S_{xi} - U_{ex})^2 + (S_{yi} - U_{ey})^2 + (S_{zi} - U_{ez})^2}, \quad (11)$$

and $$\frac{\partial e_i}{\partial B_e} = -1. \quad (12)$$

Equations (8) through (10) can be given geometric interpretations. These equations equal the cosines of the angles between the x, y and z coordinate axes and a range vector to the selected satellite. Therefore, they are the dot product between a unit vector along the corresponding coordinate axis and the range vector, divided by the magnitude of the range vector. By the definition of a dot product, this is the cosine of the angle between the vectors.

Equation (7) may be written even more compactly by defining $\delta e = [\delta e_1, \delta e_2, \delta e_3, \delta e_4]^T$, $\delta U_e = [\delta U_{ex}, \delta U_{ey}, \delta U_{ez}, \delta B_e]^T$ and G is the matrix of partial derivatives, $$\delta e = G \delta U_e. \quad (13)$$

Equation (13) relates changes in the estimated user position to changes in the error terms. The equivalent expression relating changes in pseudo-range errors to user position is, $$\delta U_e = G^{-1} \delta e. \qquad (14)$$

Equation (6) expresses a relation between the measured errors and the change in the error required to drive the algorithm to convergence. Substituting in the value for the measured errors yields, $$\delta U(n) = -G^{-1}(n) e(\eta), \qquad (15)$$

where e is given by $[e_1, e_2, e_3]^T$. To improve the estimated user location, the estimated user location at iteration n is updated as follows, $$U_e(n+1) = U_e(n) + \delta U(\eta). \qquad (16)$$

This new estimated user location will have smaller pseudo-range error than the previous estimated user location. This type of algorithm requires that four GPS satellites be in view to compute a navigation solution. During periods of balloon swinging, for example, four satellites may not be simultaneously in view. A similar situation can occur in the "urban canyon" of large cities where tall buildings can obstruct four-satellite GPS signal reception by vehicles on the streets between the buildings. For this reason, Kalman filter processing is preferred.

The position and velocity of rawinsonde 12 are averaged by an extended Kalman filter, which permits solutions in spite of the fact the object being tracked is in motion. The Kalman filter is preferably implemented in software running on PC 46. A dynamic model of the motion is formed which includes estimates of the current position and velocity as well as user clock bias. User clock bias is preferably coherent between updates. Millisecond counter 37 provides such coherency. As long as a balloon travels at constant velocity, e.g., both speed and direction remain constant, a Kalman filter will optimally improve the estimated position and velocity estimates. Kalman filters were initially developed to solve just this type of navigation problem. Kalman filters average the measurements to obtain better measurements. The Kalman filter also allows navigation updates during severe balloon swinging when a full constellation may not be visible due to shadowing. The filter will obtain optimal position estimates from the reduced constellation. Prior to incorporating a current measurement, a balloon position is estimated, which is referred to as the "a priori" position estimate. As such, it is the estimated position prior to GPS data incorporation. A GPS-based position is then calculated, and an error between the GPS derived position and the dynamic model position, based on prior velocity and position estimates, is also estimated. A pair of dynamic model estimates of both position and velocity are then refined by adding a weighted error term, the "a posteriori estimate", or a position estimate, post-GPS. The weighting is optimized to minimize an error covariance, and includes such effects as geometric dilution of precision (GDOP).

$$\begin{bmatrix} Pos_x(n+1) \\ Vel_x(n+1) \\ Pos_y(n+1) \\ Vel_y(n+1) \\ Pos_z(n+1) \\ Vel_z(n+1) \\ clkbias(n+1) \end{bmatrix} = \begin{bmatrix} 1 & \beta t & 0 & 0 & 0 & 0 & 0 \\ 0 & 1 & 0 & 0 & 0 & 0 & 0 \\ 0 & 0 & 1 & \beta t & 0 & 0 & 0 \\ 0 & 0 & 0 & 1 & 0 & 0 & 0 \\ 0 & 0 & 0 & 0 & 1 & \beta t & 0 \\ 0 & 0 & 0 & 0 & 0 & 1 & 0 \\ 0 & 0 & 0 & 0 & 0 & 0 & 1 \end{bmatrix} \begin{bmatrix} Pos_x(n) \\ Vel_x(n) \\ Pos_y(n) \\ Vel_y(n) \\ Pos_z(n) \\ Vel_z(n) \\ clkbias(n) \end{bmatrix}$$

$$x(n+1) = \phi(n) \cdot x(n)$$

The equations for a dynamic model of the vehicle motion is constructed. A dynamic model may be expressed in terms of a state transition matrix, which states that the position at a time $\Delta t$ after the last observation is equal to the last position plus the velocity times $\Delta t$. The velocity and user clock bias remain unchanged from update to update.

The velocity, speed and direction, may change as rawinsonde 12 rises. These changes are unpredictable and are incorporated into the model via a random variable, w. The covariance of w is assumed known. The assumed covariance of w is utilized to control the time constant of the Kalman filter.

A first equation, $x(n+1) = \Phi(n) \cdot x(n) + \omega$, is a model of the linearized error in pseudo range versus a delta in the x vector. The error in pseudo range is measured by PC 46. However, the final vehicle position must be expressed as x (x,y,z position and velocity). This linearization is thus essential to subsequent mathematics.

A second equation, $$p - \hat{p}^-(x,t) = \frac{\partial p}{\partial x} \Delta x + v(t)$$

allows the Kalman filter to set a new estimated position equal to the old estimated position plus the estimated velocity times the elapsed time between the updates, plus a weighted error between the measured pseudo-ranges and the predicted pseudo-ranges. The Kalman filter then derives an optimal weighting or blending factor K.

$$\hat{x} = \hat{x}^- + k(p - p(\hat{x},t)) = \hat{x}^- + k\left(\frac{\partial p}{\partial x} \Delta x + v\right)$$

A pseudo range to a satellite is the actual ranges plus a common offset due to a user clock bias. The relation between pseudo range and x, y or z position is non-linear. A derivative of these equations are necessary to generate a linear model.

The derivatives of the pseudo ranges versus x, y, z position and user clock bias are then derived (see equations 8-12). These are required by an extended Kalman filter (EKF). The Kalman filter first projects a state vector ahead via a state transition matrix, to yield an "a priori" estimate. The "a priori" estimate is then improved via pseudo-range measurements. A weighted version of the difference between an expected and measured pseudo range is added to the "a priori" estimate to improve it.

The challenge is to find the optimal K which minimizes the error covariance of the estimate. A seven-state vector is used to define the system state and four pseudo-ranges are utilized by the system.

An extended Kalman filter operates by projecting a current state ahead via the transition matrix, this involves no measurements. The projection is the "a priori" estimate. Next the measurement is included in the model, the weighed error between the measured pseudo ranges and the estimated pseudo ranges are added to the estimate to reduce the resulting error.

An error covariance is defined as the mean of the square of a difference between a true "a posteriori" filter state and the estimated "a posteriori" state. An expression for the "a posteriori" error, expressed in terms of the "a priori" error, is substituted into an equation for the error covariance, and then expanded out. The derivative of the trace of this expression with respect to K are evaluated and set to zero. This will yield an optimal blending factor.

The derivative of a trace of the covariance matrix is evaluated using a matrix calculus. This derivative is set to zero and the resulting equation solved for an optimal Kalman gain, which is also referred to as weight or blending factor.

A Kalman filter loop or recursion is executed each time a new measurement arrives, e.g., once a second for rawinsonde 12. The loop is entered with estimates of the error covariance, e.g., estimated errors in launch location and launch velocity. The Kalman gain is then computed. The errors between the estimated satellite pseudo ranges and computed pseudo ranges are computed and weighed by K to determine a correction to a state model, e.g., corrections to position, velocity and user clock bias.

The error covariance is then updated. This gives a user direct real-time feedback on the accuracy of the current velocity and position estimates.

The "a priori" error covariance determined prior to GPS measurement corrections (using a state transition model only) is updated along with the state vector for a next iteration of the algorithm. A new estimated position is generated which is simply the old position plus the velocity times the time difference between measurements.

In the dynamic model covariance, entries which account for rawinsonde 12 velocity changing may be altered to effectively change the Kalman filter's time-constant. The measurement covariance, is determined by the correlation time and the receiver noise figure.

GDOP is automatically incorporated into the model via partial derivatives of the H matrix. If a satellite constellation changes during operation, then either the dynamic model or the measurement model are emphasized by the filter, and such a decision occurs automatically within the filter.

If one or more of the four satellites in a chosen constellation is not visible, a corresponding entry is set very large and an iteration performed, which optimally updates rawinsonde 12 position even with reduced satellite sets. Reduced visibility will almost certainly occur due to pendulum swinging of rawinsonde 12 on its balloon carrier. The Kalman filter allows this to occur and still optimally updates vehicle position.

The Kalman update loop is as follows:

$k_k = P_k^- H^T (H P_k^- H^T + R)^{-1}$ compute Kalman gain,
$\hat{x}_k = \hat{x}_k + k(P_k - \hat{P}(x,t))$ compute navigation solution "aposteriori",
$P_k = (I - kH)P_k^-$ update error covariance, -continued $P_k^-(n + 1) = \phi P_k \phi^T + Q_k$ project error covariance ahead,
$x_k^-(n + 1) = \phi x(n)$ estimate new position "a priori" and $$H = \begin{bmatrix} \frac{\partial P_{e1}}{\partial x} & 0 & \frac{\partial P_{e1}}{\partial y} & 0 & \frac{\partial P_{e1}}{\partial z} & 0 & -1 \\ \frac{\partial P_{e2}}{\partial x} & 0 & \frac{\partial P_{e2}}{\partial y} & 0 & \frac{\partial P_{e2}}{\partial z} & 0 & -1 \\ \frac{\partial P_{e3}}{\partial x} & 0 & \frac{\partial P_{e3}}{\partial y} & 0 & \frac{\partial P_{e3}}{\partial z} & 0 & -1 \\ \frac{\partial P_{e4}}{\partial x} & 0 & \frac{\partial P_{e4}}{\partial y} & 0 & \frac{\partial P_{e4}}{\partial z} & 0 & -1 \end{bmatrix}.$$

It is often desirable to transform ECEF coordinates into latitude, longitude and altitude. The GPS-rawinsonde navigation algorithm determines a user position in ECEF coordinates. Such an algorithm is used to convert the ECEF navigation solution to WGS-84 Earth ellipsoid latitude, longitude and altitude and vice-versa. The WGS-84 latitude, longitude and altitude to ECEF transformation are presented first.

A transformation from WGS-84 Earth ellipsoid latitude-longitude-altitude to ECEF coordinates is given below:

$$f = \frac{1}{298.257223563}, \quad (17)$$

$$e^2 = 1 - (1 - f)^2, \quad (18)$$
$$a = 6378137.0 \text{ meters}, \quad (19)$$

$$R_N = \frac{a}{\sqrt{1 - e^2 \sin^2(lt)}}, \quad (20)$$

$$x = (R_N + h)\cos(lt)\cos(lg), \quad (21)$$
$$y = (R_N + h)\cos(lt)\sin(lg), \quad (22)$$
$$z = (R_N(1 - e^2) + h)\sin(lt), \quad (23)$$

where:
f = flattening of the WGS-84 ellipsoid,
e = eccentricity of the WGS-84 ellipsoid,
a = semi-major axis of the WGS-84 ellipsoid,
$R_N$ = radius of curvature of the prime vertical,
lt = latitude,
lg = longitude,
h = altitude, and
x, y, z = ECEF coordinates.

Such an algorithm is needed to transform the initial launch point of the weather balloon (latitude, long and altitude) to ECEF coordinates. This position will be used to initialize the navigation algorithm iterations. It is also necessary for satellite visibility calculations.

A simple iterative algorithm is used to transform from ECEF coordinates to WGS-84 Earth ellipsoid latitude-longitude-altitude. This is necessary for converting the navigation solution back to latitude-longitude-altitude. The longitude can be determined in closed form without iteration as, $$lg = \text{atan}(y/x). \quad (24)$$

No closed-form solution exists for latitude or altitude, so an iterative algorithm is included herein. On each iteration, estimated latitude and altitude are taken ($lt_e$, $h_e$) First, an algorithm error metric is defined as a difference between actual ECEF coordinates and ECEF coordinates generated by an estimated latitude, calculated longitude and estimated altitude:

$$e_x = x - (R_N + h_e)\cos(lt_e)\cos(lg),$$

$$e_y = y - (R_N + h_e)\cos(lt_e)\sin(lg),$$

$$e_z = z - (R_N(1-e^2) + h_e)\sin(lt_e), \quad (25)$$

where $$R_N = \frac{a}{\sqrt{1 - e^2 \sin^2(lt_e)}}. \quad (26)$$

The error may be expressed as a vector, $e = [e_x, e_y, e_z]^T$. In a manner similar to the above navigation algorithm, using the concept of total differential, a matrix is constructed relating changes in an error metric to changes in latitude and altitude.

$$\delta e = J \delta wgs_e, \quad (27)$$

where, $wgs_e = [lt_e, lg, h_e]^T$ are an estimated latitude, calculated longitude and estimated altitude and $J$ is, $$J = \begin{bmatrix} \frac{\partial e_x}{\partial lt_e} & \frac{\partial e_x}{\partial h_e} \\ \frac{\partial e_y}{\partial lt_e} & \frac{\partial e_y}{\partial h_e} \\ \frac{\partial e_z}{\partial lt_e} & \frac{\partial e_z}{\partial h_e} \end{bmatrix}. \quad (28)$$

Evaluating the indicated partial derivatives yields:

$$\frac{\partial R_N}{\partial (lt_e)} = \frac{6378137 e^2 \sin(2 lt_e)}{2(1 - e^2 \sin^2(lt_e))^{3/2}}, \quad (29)$$

$$\frac{\partial e_x}{\partial (lt_e)} = \frac{\partial R_N}{\partial (lt_e)} \cos(lt_e)\cos(lg) + (R_N + h_e)\sin(lt_e)\cos(lg), \quad (30)$$

$$\frac{\partial e_y}{\partial (lt_e)} = \frac{\partial R_N}{\partial (lt_e)} \cos(lt_e)\sin(lg) + (R_N + h_e)\sin(lt_e)\sin(lg), \quad (30)$$

$$\frac{\partial e_z}{\partial (lt_e)} = \frac{\partial R_N}{\partial (lt_e)} (1 - e^2)\sin(lt_e) - (R_N(1-e^2) + h_e)\cos(lt_e), \quad (30)$$

$$\frac{\partial e_x}{\partial h_e} = -\cos(lt_e)\cos(lg), \quad (33)$$

$$\frac{\partial e_y}{\partial h_e} = -\cos(lt_e)\sin(lg), \quad (34)$$

and $$\frac{\partial e_z}{\partial h_e} = -\sin(lt_e). \quad (35)$$

Here, $J$ only contains derivatives relative to latitude and altitude, since longitude is known analytically.

Such an algorithm will adjust an estimated latitude and altitude at each step so that the sum of the error and the change in the error approach zero. Therefore, an estimated latitude and longitude are changed so that the error on the next iteration will be small (near zero). A squared error term for a next iteration is the sum of the current error plus an estimated change in the error (equation (27)). The square of this is given by, $$\|E\|^2 = (e + \delta e)^T(e + \delta e). \quad (36)$$

Substituting in equation (27) and differentiating with respect to $\delta wgs$ yields, $$\frac{\partial \|E\|^2}{\partial \delta wgs} = 2 J^T e + 2 J^T J \delta wgs. \quad (37)$$

Setting this derivative to zero yields the optimal iteration update (smallest error)

$$\delta wgs = -(J^T J)^{-1} J^T e. \quad (38)$$

The change in the wgs vector expressed by equation (38) is the optimal linear correction to drive the error defined by equation (36) towards zero. The complete algorithm is to calculate a longitude, using equation (24). The wgs vector is initialized with an estimate of the latitude and altitude of the remote sensor. This is either a weather balloon launch point or its last calculated position. This estimate of the wgs vector is then repeatedly improved using, $$wgs(n+1) = wgs(n) + \delta wgs(n) wg, \quad (39)$$

where $\delta wgs$ is defined by equation (38). Such an algorithm continues to iterate until $\delta wgs$ falls below a user defined threshold. Typically, only two or three iterations are required.

The pseudo-range measurements made by PC 46 contain several error terms. The major sources of error are SV clock and ephemeris errors, atmospheric delays, group delay, multipath, receiver noise, resolution and vehicle dynamics.

Typically, these errors combine to an uncertainty of about six meters for each pseudo-range measurement if selective availability is off. With selective availability on, these errors average about one hundred meters. In a differential mode, all errors cancel except receiver noise, measurement resolution and some ephemeris errors. Differential pseudo-range errors average about five meters with selective availability on. Pseudo-range errors are multiplied by a geometric dilution of precision (GDOP) to obtain the geo-location accuracy.

GDOP is a multiplication factor by which pseudo-range standard deviations are multiplied to obtain a navigation solution standard deviation. GDOP errors are highly dependent on the geometry of a set of four space vehicles (SVs) selected by a navigation algorithm. GDOP can be used as a satellite constellation selection criteria. One arrangement selects four space vehicles which yield either an optimal GDOP or an acceptably low GDOP. The PC 46 precomputes GDOP and satellite elevation angles prior to balloon launch. It then selects the highest four satellites which yield an acceptably low GDOP at the time of a measurement. The highest satellites are selected to improve the altitude resolution of system 10 and to avoid losing a satellite signal due to any balloon payload swinging which affects the hemispherical reception lobe of GPS antenna 16.

GDOP is analytically developed by considering equation (14). This equation relates the error in user navigation solution ECEF coordinates to errors in the pseudo-range measurements, $$\delta U = G^{-1} \delta e. \quad (40)$$

A vertical dilution of precision (VDOP) and a horizontal dilution of precision (HDOP) are measured as well as GDOP. VDOP indicates the precision estimate of the altitude measurement. HDOP indicates the latitude, longitude position accuracy. This requires rotating the ECEF coordinate system to a local coordinate system defined by local vertical, north and east vectors (V, N, E). A rotation matrix R is defined as follows, $$R = \begin{bmatrix} V_x & V_y & V_z & 0 \\ N_x & N_y & N_z & 0 \\ E_x & E_y & E_z & 0 \\ 0 & 0 & 0 & 1 \end{bmatrix}. \quad (41)$$

Multiplying any ECEF coordinates, M, by R, will project M onto the local vertical, north and east basis vectors. R is an orthonormal rotation matrix which converts from ECEF coordinates to local coordinates. Equation (40) can be rewritten in terms of the local vertical and horizontal coordinates as follows, $$\delta L = RG^{-1}\delta e. \quad (42)$$

The term, $\delta L$ is the error in a local coordinate system vector caused by errors in the pseudo-range measurements. The error covariance matrix is a four-by-four matrix composed of the expected values of the squares and products of the errors in a user position. The diagonal terms of the covariance matrix, namely the squares of the expected errors, are the variances (the squares of the expected $1\sigma$ values of the local coordinates). The off-diagonal terms are the covariances between the local coordinates and reflect the correlations between these measurements, $$cov(\delta L) = E[(\delta L)(\delta L)^T]. \quad (43)$$

where:
E[•] indicates the expected value.
Substituting equation (42) into (43) yields:

$$cov(\delta L) = E[RG^{-1}\delta e \delta e^T (G^{-1})R^T]. \quad (44)$$

But the pseudo-range measurements are uncorrelated and have a variance of $\sigma^2$, $$E[\delta e \delta e^T] = \begin{bmatrix} \sigma^2 & 0 & 0 & 0 \\ 0 & \sigma^2 & 0 & 0 \\ 0 & 0 & \sigma^2 & 0 \\ 0 & 0 & 0 & \sigma^2 \end{bmatrix} = \sigma^2 I. \quad (45)$$

Under these conditions, equation (44) may be written as, $$cov(\delta L) = \sigma^2[RG^{-1}(G^{-1})^T R^T] = \sigma^2 R[G^T G]^{-1} R^T. \quad (44)$$

The diagonal terms of the covariance matrix represent the variances of the local vertical, north, east and B terms of the navigation solution. Since only the spatial accuracy of such an algorithm is of concern, only the first three terms of the trace of the covariance represent the variance of the spatial measurement. The square root of the sum of the first three terms of the correlation matrix divided by the pseudo-range standard deviation is defined as the geometric dilution of precision (GDOP), $$GDOP = \sqrt{cov(1,1) + cov(2,2) + cov(3,3)} \ /\sigma. \quad (47)$$

Similarly, VDOP is simply the square root of the vertical component of the covariance divided by the standard deviation of the pseudo-range measurement, $$VDOP = \sqrt{cov(1,1)} \ /\sigma. \quad (48)$$

HDOP is the square root of the sum of both horizontal components of the covariance divided by the standard deviation of the pseudo-range measurement, $$HDOP = \sqrt{cov(2,2) + cov(3,3)} \ /\sigma. \quad (49)$$

Equations (47) through (49) indicate that GDOP, HDOP and VDOP are functions of the satellite locations relative to a user only. GDOP is multiplied by the standard deviation of the pseudo-range measurement to obtain the standard deviation in a user location. The standard deviation of the pseudo-range measurements is about 3.6 to 6.3 meters, total.

A satellite selection algorithm helps determine which satellites to use and organizes visible satellites according to their respective elevation angles. It then selects a combination of four visible satellites that have the greatest elevation angles and acceptably low GDOP. Such a combination of satellites forms a settled navigation constellation that remains undisturbed until GDOP levels degrade or the satellites' elevation angles become too acute. The selection criteria tends to maximize the altitude resolution of a system, and reduces the possibility of a satellite signal loss due to adverse motion of the remote sensor. Rawinsondes tend to pendulum swing, and sonobuoys tend to bob in the water. Both such motions can be adverse to good GPS satellite visibility.

Signals from satellites low on the horizon may be in a reception lobe of the GPS antenna due to the swing of the weather balloon payload. GPS antennas tend to receive signals in one hemisphere only. By selecting the highest satellites which yield acceptable GDOPs, the problem of swinging is partially avoided. The Kalman filter operates with a subset of GPS satellites. But at least four satellites with low GDOP must eventually be seen, e.g., within ten updates. A satellite versus time table is constructed by a ground processor as part of its pre-launch activity. If $S_a$ number of satellites are above an elevation mask, then the maximum number of four satellite permutations which such an algorithm must search through is, $$\text{permutations} = \binom{S_a}{4} = \frac{S_a!}{(S_a - 4)! 4!}. \quad (50)$$

The GPS system specifies that five to eleven satellites will be in view above the five degree elevation mask at any given instant. Equation (50) indicates that from five to 330 permutations must be evaluated to determine the optimal satellite constellation.

Vectors pointing in the local vertical, north and east directions are needed for satellite visibility calculations and VDOP, HDOP calculations. The local vertical, north and east vectors may be derived by taking the partial derivatives of the WGS-84 position equations with respect to altitude, latitude and longitude respectively. Local vertical is defined as the direction of movement if the altitude were changed. Thus, the partial of the WGS-84 ellipsoid coordinates with respect to "h" (altitude) yields a vector pointing in the local vertical direction. Likewise, the partial derivative with respect to latitude and longitude yield local north and east. The ECEF position of a user defines a vector P, this is expressed in terms of a user latitude, longitude and altitude as, $$P = \begin{bmatrix} (R_N + h)\cos(lt)\cos(lg) \\ (R_N + h)\cos(lt)\sin(lg) \\ \{R_N(1 - e^2) + h\}\sin(lt) \end{bmatrix}, \qquad (51)$$

where, $$R_N = \frac{a}{\sqrt{1 - e^2 \sin^2(lt)}} \qquad (52)$$

$$e^2 = 1 - (1 - f)^2$$

$$f = \frac{1}{298.257223563}$$

$$a = 6378137.0.$$

The local vertical vector is defined as the direction of the change in P if h (altitude) is changed, $$V = \frac{v}{\|v\|}, \qquad (53)$$

$$v = \frac{\partial P}{\partial h}.$$

Similarly, the local north vector is defined as the direction of the change in P if the latitude is changed, $$N = \frac{n}{\|n\|}, \qquad (54)$$

$$n = \frac{\partial P}{\partial lt}.$$

The local east vector is defined as the direction of the change in P if the longitude is changed, $$E = \frac{e}{\|e\|}, \qquad (55)$$

$$e = \frac{\partial P}{\partial lg}.$$

Evaluating these partial derivatives gives, $$\frac{\partial P}{\partial h} = \begin{bmatrix} \cos(lt)\cos(lg) \\ \cos(lt)\sin(lg) \\ \sin(lt) \end{bmatrix}, \qquad (56)$$

$$\frac{\partial P}{\partial lt} = \begin{bmatrix} \frac{\partial R_N}{\partial lt}\cos(lt)\cos(lg) - (R_N + h)\sin(lt)\cos(lg) \\ \frac{\partial R_N}{\partial lt}\cos(lt)\sin(lg) - (R_N + h)\sin(lt)\sin(lg) \\ \frac{\partial R_N}{\partial lt}(1 - e^2)\sin(lt) + (R_N(1 - e^2) + h)\cos(lt) \end{bmatrix}, \qquad (57)$$

-continued $$\frac{\partial P}{\partial lt} = \begin{bmatrix} -(R_N + h)\cos(lt)\sin(lg) \\ (R_N + h)\cos(lt)\cos(lg) \\ 0 \end{bmatrix}, \qquad (58)$$

where, $$\frac{\partial R_N}{\partial (lt)} = \frac{6378137e^2 \sin(2lt)}{2(1 - e^2 \sin^2(lt))^{3/2}}. \qquad (59)$$

Substituting in user altitude, latitude and longitude into equations (53) through (59) yields the local vertical, north and east vectors. These are used for HDOP, VDOP and satellite visibility calculations.

The elevation angle of each satellite in an optimal four element navigation constellation, such that the higher elevation satellites generate good altitude data (lower VDOPs), and the lower elevation satellites generate good horizontal positions (lower HDOPs). In general, VDOP will exceed HDOP, since more satellites lie closer to the horizon than high in the sky.

The highest satellites with a GDOP less than a user set GDOP mask are selected by an algorithm. This yields sub-optimal GDOPs and high satellite elevation angles. Thus a system less is likely to lose a satellite signal due to swinging of the weather balloon payload.

With the total positional standard deviation of a navigation solution for non-differential operation with selective availability off, the mean value of error can be expected to be about five meters. In a differential mode, many of the error sources of the pseudo-range errors will cancel out. Since total error is obtained by multiplying GDOP by the $1\sigma$ of a pseudo-range error budget, total error will decrease linearly with decreases in the pseudo-range error budget. Differential operation produce errors about one-third.

The GDOP, HDOP and VDOP for an optimal four element navigation constellation versus simulation time has a mean VDOP value that is about 2.8, and a mean HDOP value that is about 1.8. A GDOP mean value is about 3.4. These values may be multiplied by a pseudo-range error budget $1\sigma$ value to obtain a total positional standard deviation.

A ground processor must estimate the pseudo-ranges to each of the four satellites in a selected optimal constellation. A pseudo-range to a selected space vehicle is estimated by generating a copy of a "Gold code" for that satellite (the paradigm), and correlating this against the received signal. (Gold codes generate strong correlations when the paradigm and received signal are aligned, e.g., good auto-correlation properties; and, they exhibit small correlations to the Gold codes transmitted by the other space vehicles in view at the time of observation, e.g., good cross correlation properties.)

An abscissa associated with a peak of a correlation function corresponds to a delay between a paradigm and a received signal. This delay is scaled from time to spatial units to generate a pseudo-range. A correlation peak is triangular in shape with a peak value that corresponds to a code delay. The correlation triangle spans seven sample periods, twice the over-sample rate minus one, since the code is four times over-sampled. A sampling rate of four samples per code chip will yield a pseudo-range resolution of 240 feet.

A linear interpolation of a correlation triangle is used to improve resolution. The linear model of a correlation peak is correct since a correlation peak is piece-wise linear under noiseless conditions. Two line segments are matched to a correlation function, e.g., the rising edge of the correlation triangle, and the falling edge of a correlation triangle. An intersection of these lines corresponds to an estimated pseudo-range. Interpolation typically improves the range resolution to 6.7 feet, at −15 dB received SNR.

Such line segments used to interpolate the correlation function are defined by a pair of points preceding a correlation peak and a pair of points succeeding the correlation peak. The two points in front of the correlation peak may be referred to as $(x-1, y-1)$ and $(x-2, y-2)$ Similarly, the two points after the correlation peak may be referred to as $(x+1, y+1)$ and $(x+2, y+2)$. With such definitions, the interpolated correlation peak is, $$x_{opt} = \frac{(b_2 - b_1)}{(m_1 - m_2)}, \qquad (60)$$

where, $$b_1 = y_{-2} - m_1 x_{-2}, \qquad (61)$$
$$b_2 = y_{+2} - m_2 x_{+2},$$
$$m_1 = \frac{(y_{-1} - y_{-2})}{(x_{-1} - x_{-2})}, \text{ and}$$
$$m_2 = \frac{(y_{+2} - y_{+1})}{(x_{+2} - x_{+1})}.$$

Conceptually, a correlation may be viewed as a multiplication and addition of adjacent samples in two finite-length waveforms (the paradigm and received signal). This multiplication and addition procedure is repeated for all overlapping offsets of the waveforms. A waveform offset corresponding to a correlation peak is proportional to a pseudo-range to a selected satellite. Only the overlapped portions of the codes contribute to the correlation. When two codes are aligned, between 3.5 and four code cycles will be overlapped (true for the maximum correlation peak). The exact amount of overlap is related to a received code phase within a sample buffer. A total of four correlation peaks occur. However, a maximum peak always occurs within one-half a code cycle time of a center lag of a correlation function. Only one peak occurs within this interval. The correlation lags about a center of the correlation function, plus or minus one-half a code cycle time, and are the only lags which are examined by a pseudo-range extraction processor.

Fast pseudo-range extraction techniques can reduce the correlation-function computational-burden by a factor of seventy-three. A fast pseudo-range extraction processing comprises a pair of fast Fourier transforms and one inverse fast Fourier transform.

Correlation functions may be implemented with fast Fourier transform algorithms. A frequency domain technique uses a fast Fourier transform algorithm to implement a linear correlation of a finite length paradigm and a received code. A processor collects two complete cycles of a GPS C/A code. A pair of single-bit digitizers (I and Q), such as digitizers 90 and 94 (FIG. 2), running at 8.184 MHz will collect four complex samples per PRN code chip. Four complete cycles of the PRN code, or 16,368 single-bit samples from the digitizer, will be collected by a processor. The fast correlation technique uses 16,400 zeros appended to the tail of a sequence so that a linear correlation of two sequences is performed instead of a circular correlation. The zero-padded linear sequence is fast Fourier transformed with a 32,768-length point transform.

Exactly 16,368 bits of the four-times over-sampled paradigm code for a selected space vehicle are fetched from memory and multiplied by a complex exponential to correct for an estimated Doppler shift. The data is zero padded and fast Fourier transformed. A complex conjugate of a paradigm spectrum is then multiplied by a fast Fourier transform of a received sequence. The data is then inverse-fast Fourier transformed with a 32,788-length transform to construct a correlation output. Fast Fourier transform cells zero through 2045 will correspond to paradigm lags of zero to 512 microseconds. Fast Fourier transform cells 32,767 through 24,584 will correspond to code phase lags of zero to 512 microseconds. The equivalent range between any two adjacent fast Fourier transform cells is 240 feet. The remaining fast Fourier transform cells will correspond to code offsets which generate smaller correlation peaks and are not of interest.

Since a received signal is sampled at 4.092 MHz, one cycle of a PRN code will contain 4092 samples (the PRN code repeats every millisecond). Direct implementation of a cros-correlation for each code lag would require 133 million multiplications per pseudo-range measurement. In contrast, the fast correlation technique requires sixty-eight times fewer multiplications.

An input signal requires a 32,768-point transform for each pseudo-range measurement. A paradigm signal is generated for each of thirty-two possible space vehicles. These are fast Fourier transformed with a 32,768-point transform and permanently stored in memory. The fast Fourier transformed paradigm data must be retrieved from memory and circularly shifted an amount equal to an estimated Doppler shift and conjugated. The paradigm signal is precomputed, so paradigm generation requires no computation, only indexing into memory. The indexing into the table holding the paradigm spectrum is offset proportional to the Doppler shift of a selected space vehicle signal. The time domain complex multiplication is replaced by a circular rotation in a frequency domain. The Doppler compensation is implemented on a stored Fourier transform of a paradigm for a selected space vehicle by simple memory indexing. A transform of the paradigm and received signal are conjugate multiplied and inverse transformed to produce a final correlation output. The computation required by such an algorithm is therefore two 32,788-length-point transforms.

The total number of "butterflies" associated with a fast Fourier transform is $(N/2)*(\log_2 N)$. A 32,768-point fast Fourier transform requires 245,760 butterflies. Since two transforms are required per output correlation, and each butterfly requires four multiplications, the total number of multiplications is 1.966 million, about sixty-eight times fewer multiplications than the direct implementation of the correlation function.

A Texas Instruments (Dallas, Tex.) TMS320C30 chip can perform a 32,768-point transform in sixty-four milliseconds. Each pseudo-range extraction requires two transforms, so each pseudo-range extraction require 128 milliseconds to complete. Four pseudo-ranges must be estimated per navigation fix, so 512 milliseconds of processor time per navigation fix is required to extract the necessary pseudo-ranges.

A test of the fast pseudo-range extraction was conducted by the present inventor to determine a minimum signal-to-white-noise-ratio (SWNR) at which such an algorithm described herein will operate and the level of Doppler error that such an algorithm can tolerate. The tests demonstrated that the dual (I and Q) single-bit analog-to-digital converters are a viable approach. The tested GPS signals included a set of Gold code PRN modulated signals from eleven space vehicles. (Eleven is the maximum number of vehicles that can possibly be in view from any one GPS receiver.) The signals deliberately included two MHz band limited Gaussian noise. Doppler offsets were added to the signals and complex single-bit sampling was used. Four code cycles of a single-bit received signal were collected, zeros were appended in accordance with the fast correlation algorithm, and this data was fast Fourier transformed with a 32,768-point fast Fourier transform. The paradigm signal for a selected space vehicle was generated. The sequence was multiplied by a complex exponential to compensate for the Doppler offset of a particular SV. The complex signal was not limited to a single-bit. The sequence was zero padded and fast Fourier transformed. The paradigm spectrum was conjugated and multiplied by the spectrum of the single-bit received signal. The resulting sequence was then inverse fast Fourier transformed with a 32,768-point transform.

The C/A pseudo-random code repeats once every millisecond. In terms of radio frequency propagation distances at the speed of light, this corresponds to a code repeat spatially every 186 miles. A pseudo-range extracted from a GPS signal is an actual pseudo-range to a satellite, modulo 186 miles. A user must calculate the range from a satellite to the 186 mile range marker closest to an estimated position. The distance is then added to a PRN code derived pseudo-range equivalent of distance. The position of a 186 mile range marker closest to a user's estimated position is referred to as "P186". The distance derived from the PRN code is actually plus or minus a 93 mile offset from P186.

To resolve such a range ambiguity, a processor preferably has a rough estimate of its position already available. That estimate should be accurate to within 186 miles. The launch point of a balloon is typically known with the required degree of accuracy. Such a known position is used to calculate P186. After launch, the last estimated balloon position is used as an estimated position of the weather balloon. In this manner, the range ambiguity of the C/A code is resolved.

Alternative approaches to balloon velocity are possible, although not preferable. A first takes the difference in two ECEF position fixes of a balloon and divides by the time difference to determine velocity. A few of the measurements may be averaged to generate a smoothed velocity estimate. The main advantage of this approach is its simplicity.

A more sophisticated approach involves measuring the pseudo-range rate to each of the satellites in view and averaging these measurements. The averaged pseudo-range rate measurements are then converted to balloon velocity. An advantages of this approach is four pseudo-range measurements are available to determine the three unknown velocity estimates (x, y and z velocity components). The additional measurement may be included in a solution via a least-squares data fit to improve the measurement accuracy.

Another advantage of this approach is the pseudo-range measurements are statistically uncorrelated, so simple first order Kalman filter smoothing of a pseudo-range rate measurement is easily implemented and statistically correct. The navigation solution ECEF velocity components (x, y and z) are correlated, so simple averaging is not the optimal algorithm.

Since the range rate measurements are uncorrelated, simple second order (pseudo-range and pseudo-range rate) Kalman filters may be used to smooth the pseudo-range rate measurements. The pseudo-range rate measurements include the range rate of the satellites plus the range rate of the balloon. The range rate of the satellite is easily calculated from the ephemeris data, and must be computed anyway to determine the Doppler offset of each satellite signal, where Doppler is range rate divided by signal wavelength. The satellite range rate is subtracted from the measured pseudo-range rate to generate an estimated balloon range rate. The range rate is then averaged to smooth the estimate. A set of four balloon pseudo-range estimates are then typically converted to an ECEF velocity with a simple matrix operation. In order to derive this matrix operation, a known balloon velocity, V, projects a range vector to each satellite in view. The projection is simply the dot product and can be expressed in matrix form as follows, $$\begin{bmatrix} r_{1x} & r_{1y} & r_{1z} \\ r_{2x} & r_{2y} & r_{2z} \\ r_{3x} & r_{3y} & r_{3z} \\ r_{4x} & r_{4y} & r_{4z} \end{bmatrix} \begin{bmatrix} v_x \\ v_y \\ v_z \end{bmatrix} = \begin{bmatrix} \dot{r}_1 \\ \dot{r}_2 \\ \dot{r}_3 \\ \dot{r}_4 \end{bmatrix}, \quad (62)$$

where r-dot represents a balloon pseudo-range rate and the rows in the left matrix are unit vectors in the direction of the corresponding satellite. This can be expressed more compactly as, $$RV = \dot{R}. \quad (63)$$

The R matrix is without dimension since it has been normalized. More pseudo-range rate equations are available than the number of unknowns in velocity (x, y and z components). In other words, this set of equations are over-determined. Each of the range rates have a small error associated with them. Because of the error, generally there is no V which matches all four of the equations exactly. The error in the equation may be expressed as, $$E = RV - \dot{R}. \quad (64)$$

The problem has now been formulated in the standard least squares format. The least squares technique finds the V which minimizes the square of the error term. It is found by multiplying equation (64) by its transpose, differentiating this and setting this result to zero. These operations yield the following optimal velocity estimate, $$V_{opt} = (R^T R)^{-1} R^T \dot{R}. \quad (65)$$

Equation (65) gives balloon velocity components in ECEF coordinates if the satellites ECEF coordinates are used for R and R dot. Generally a user is interested in the weather balloon lateral and vertical velocity in a local vertical/horizontal coordinate system. The result obtained by equation (65) is multiplied by a three-by-three unitary rotation matrix to transform the result into the local vertical, north, east coordinate system. The vertical component of velocity is due to two factors, the weather balloon rise rate, and the vertical component of the wind. A horizontal component of the wind velocity may be read out by taking the square root of a sum of the squares of the two horizontal components. A horizontal wind direction may be obtained by taking the inverse tangent of these two components. To obtain a vertical component of the wind, a balloon's estimated rise rate must be subtracted from a magnitude of a measured vertical speed.

Space vehicle (SV) Doppler may be determined by locating an SV at a current time and a current time plus one second. Space vehicle location at both times are determined from the ephemeris data. A range from an estimate user position to the SV is determined for both instances. A difference in these two measurements divided by the time difference, e.g., one second, will be the range rate for the satellite. The range rate divided by wavelength is the Doppler. The wavelength of a GPS signal is 0.6234 feet. The Doppler measurement is used to correct the satellite paradigm signal during fast pseudo-range extraction.

Each GPS satellite transmits navigation information. The navigation message contains information on: condition of each satellite, satellite clock offset, precise orbital ephemeris and less-precise catalog data for all GPS space vehicles. A user can thereby determine a GPS satellite's precise position as a first step in solving for the user's position.

A navigation message is sent from the GPS satellites to ground station 14 at fifty bits per second and is 1500 bits long. It takes thirty seconds to collect an entire navigation frame. Collecting enough RF data at the balloon to extract the ephemeris and telemetering it to ground station 14 would be far too costly and time consuming. Instead, the navigation message is collected on the ground by GPS receiver 44, which may comprise a commercially-available GPS receiver, e.g., the Trimble Navigation (Sunnyvale, Calif.) ADVANCED NAVIGATION SENSOR (TANS) GPS receiver, for such ephemeris collection. The exact format of the navigation message as broadcast from the GPS satellites is transparently managed by the GPS receiver 44.

Five independent orbital elements are sufficient to completely describe the size, shape and orientation of a GPS satellite's orbit. A sixth element can pinpoint the position of a satellite along an orbit at any particular time. The classical orbital elements are: a, semi-major axis, which defines the size of the conic orbit; e, eccentricity, which defines the shape of the orbit; i, inclination angle between the earth's rotation axis and a normal to an orbital plane; $\Omega$, longitude of the ascending node, the angle between the Greenwich meridian and where an orbit rises through the equatorial plane; $\omega$, argument of periapsis, the angle in the plane of the satellite's orbit, between the ascending node and the periapsis point, measured in the direction of the satellites motion; and D, true anomaly at epoch, which is an angle between the periapsis and a satellite at an "epoch" time The challenge is to convert these elements to a satellite location, given a GPS system time. Such elements are sufficient to describe the satellite orbit for purposes of satellite visibility and GDOP calculations, and are provided in catalog (Block III) parameters. If the Earth were homogeneous and spherical, the catalog data would be sufficient to accurately describe the GPS satellite orbits if the influences of the Moon and the Sun could be ignored. In order to obtain more accurate ephemeris data for a navigation algorithm, additional harmonic correction terms are sent by the satellites. Catalog data allows for a rapid determination of which satellites are in view and their associated GDOPs. Catalog data requires less storage resources than ephemeris data, and consequently yields less accurate orbital positions. Ephemeris harmonic corrections are perishable and will only be valid for a few hours. Catalog data can retain reasonably accuracy for several weeks.

A satellite's location in ECEF coordinates is determined by executing the following algorithm:

$\mu = 3.966005 \times 10^{14}$ m/sec, (Earth's grav. param.)
$\Omega_c = 7.292115147 \times 10^{-5}$ rad/sec, (rot. rate)

$A = \sqrt{A^2}$ , (semi-major axis)

$\eta_o = \sqrt{\dfrac{\mu}{A^3}}$ , (computed mean motion)

$t_k = t - t_{oc}$ (time from epoch)
$n = n_o + \Delta n$, (corrected mean anomaly)
$M_k = M_o + nt_k$, (mean anomaly)
$M_k = E_k - e\sin E_k$, (Kepler: eccentric anomaly)
$\cos v_k = (\cos E_k - e)/(1 - e\cos E_k)$, (true anomaly)

$\sin v_k = \sqrt{1 - e^2} \sin E_k/(1 - e \cos E_k)$, (true anom.)

$\phi_k = v_k + \omega$, (argument of latitude)
$\delta u_k = C_{us} \sin 2\phi_k + C_{uc} \cos 2\phi_k$, (lat. correction)
$\delta r_k = C_{rc} \cos 2\phi_k + C_{rs} \sin 2\phi_k$, (radius correction)
$\delta i_k = C_{ic} \cos 2\phi_k + C_{is} \sin 2\phi_k$, (inclin. correction)
$u_k = \phi_k + \delta u_k$, (corrected argument of latitude)
$r_k = A(1 - e\cos E_k) + \delta r_k$, (corrected radius)
$i_k = i_o + \delta i_k$, (correction inclination)
$x_k' = r_k \cos u_k$, (position in orbital plane)
$y_k' = r_k \sin u_k$, (position in orbital plane)
$\Omega_k = \Omega_o + (\Omega - \dot{\Omega})t_k \Omega t_{oc}$, (corrected long.)
$x_k = x_k'\cos\Omega_k - y_k \cos i_k \sin\Omega_k$, (fixed coord.)
$y_k = x_k'\sin\Omega_k + y_k \cos i_k \cos\Omega_k$, (fixed coord.)
and
$z_k = y_k'\sin i_k$. (fixed coord.)

The GPS system does not broadcast true anomaly. System 10 broadcasts mean anomaly at epoch and a user must solve Kepler's equation for the true anomaly. Kepler's equation and its relation to the true anomaly is, $M_k = E_k - e\sin E_k$, (66)
$\cos v_k = (\cos E_k - e)/(1 - e\cos E_k)$, and (67)

$\sin v_k = \sqrt{1 - e^2} \sin E_k/(1 - e \cos E_k)$. (68)

Equation (66) is iteratively solved for $E_k$ using Newton's method knowing $M_k$. Term $E_k$ is initially estimated as $M_k$ on the first iteration. Satellite location from catalog data does not perform any of the correction calculations. The corrections require a full set of ephemeris parameters. Catalog-based orbital positions are useful for determining satellite visibility, and for calculating GDOP, VDOP and HDOP. The full set of ephemeris parameters must be used and corrections applied for navigation solution purposes.

A space vehicle code phase time can be offset by up to one whole cycle time of the PRN code. A user must determine this time offset and correct for it. The navigation message contains three polynomial coefficients which are used to determine this offset. GPS time is determined as follows, $$t = t_{sv} - \Delta t_{sv}, \quad (69)$$

$$\Delta t = a_0 + a_1(t - t_{oc}) + a_2(t - t_{oc})^2, \quad (70)$$

where t is GPS time in seconds, $t_{sv}$ is a space vehicle code phase time and $\Delta t$ is a correction factor.

A given satellite is "visible" at a specified location if its elevation lies between ninety degrees and a user defined elevation mask. A satellite's elevation angle is computed by: computing a satellite's location in ECEF coordinates, normalizing this vector, computing the local vertical vector, normalizing this vector, forming the dot product of these two normalized vectors. The satellite elevation in radians is $\pi/2$ minus the arc cosine of the dot product.

GPS time is obtained to an accuracy of one second from the GPS receiver 44 through one of two "RS-422" type industry-standard serial interfaces. A time message is sent to digital card 50, which maintains GPS time to an accuracy of one millisecond. A sub-second timer is synchronized by a one pulse per second ("1-PPS") output of GPS receiver 44. GPS time, as maintained on the digital card 50, is stored in a FIFO memory whenever a downlink message frame is sent. The stored time is the GPS time at the time a message was received to within a millisecond. GPS time is used by ground station 14 to determine the position of the satellites at the time of a measurement.

Conventional differential GPS correction methods are used to fine tune measurements from airborne rawinsonde 12 to increase the accuracy of the GPS navigation solution. Differential GPS corrects measurements from airborne rawinsonde 12 based on error measurements made at ground station 14, which first calculates the pseudo-ranges to each of the satellites in an optimal constellation selected by the balloon processor. Ground station 14 then generates pseudo-range errors based on the satellite's location and a known, previously surveyed position of GPS antenna 42. Therefore, ground station 14 forms a difference between a measured range to the satellites and a computed range. These pseudo-range error terms are then subtracted from the pseudo-ranges calculated for rawinsonde 12. In this manner, many of the error sources are eliminated. A significant benefit of differential operation is a cancellation of the selective availability errors. Left uncorrected, selective availability generated pseudo-range errors can be on the order of one hundred meters, or more. The differential correction technique typically reduces unauthorized receiver pseudo-range errors to about four to five meters. The differential corrections preferably are implemented in software on PC 46.

The noise figure of GPS front-end 18 includes two major components, the pre-selector filter loss and the noise figure of low-noise RF amplifier 62.

The overall gain of the receiver is defined as the in-band signal gain from antenna 16 to the output of IF amp 72. The IF output is the input to comparator 20, which includes high impedance voltage comparators 91 and 95. The gain of the receiver front-end 18 can be determined for a given desired signal level at the input to the voltage comparator and for a given antenna input signal level.

The GPS signal is a direct sequence spread spectrum signal with a worst case power level of −160 dBW (−130 dBm). With an antenna gain of three decibels, the received signal level is −127 dBm. Thermal noise in the 1.3 MHz receiver bandwidth is −113 dBm. With a receiver noise figure of four dB, the receiver input noise level is −109 dBm. The minimum signal to noise ratio at the output of the receiver is −18 dB.

The −18 dB signal-to-noise ratio indicates that the received signal is dominated by thermal noise. To calculate receiver gain, the input signal is assumed to be thermal noise. The noise level at the input to the receiver is −109 dBm. The noise voltage for a power level of −109 dBm into fifty ohms is 0.77 $\mu$Vrms. For a 0.1 Vrms signal level at the input to the comparator, the receiver gain is 96 dB.

The GPS signal is right hand circularly polarized at a center frequency of 1575.42 MHz. The satellites in a set used to determine location can have elevation angles greater than 5° above the horizon, and any angle in azimuth. The GPS antenna 16 must be right hand circularly polarized for greatest efficiency, have omni-directional azimuth coverage and have a nearly hemispherical elevation beam width.

Two antenna types are commonly used to meet the requirements of GPS signals. A quadrifilar antenna is a conical spiral wire antenna. A microstrip antenna is a printed circuit patch type antenna. Both antenna types are acceptable for GPS antenna 16. The microstrip antenna is a lower profile, lighter weight antenna, as compared with the quadrifilar antenna. Commercial microstrip antennas are available with gains of three dBic.

BPF 60 is a fixed tuned filter at 1575.42 MHz and has a bandwidth of at least two MHz and has low loss, since pre-selector filter loss adds directly to receiver noise figure. A filter with a bandwidth of two MHz and a center frequency of 1575.42 MHz would have a percentage bandwidth of 0.127%. A filter with such a small percentage bandwidth may not be practical in a small size, lightweight configuration. Tradeoffs are therefore unavoidable between filter bandwidth, insertion loss and size.

Various filter types were investigated by the present inventor. A two-section coaxial resonator type of filter was designed with a bandwidth of ten MHz (1.6%) and an estimated loss of two dB. The filter is small size, lightweight and low cost.

GPS front-end 18 is a single-stage downconverter type that translates the GPS signals from a center frequency of 1575.42 MHz to an IF center frequency of 32.736 MHz. A low power GaAs ASIC may be used for the low-noise RF amplifier stage 62 and mixing stage 64 of the downconverter. Such devices are typically used in both cellular telephones and GPS receivers. The local oscillator (LO 74) outputs a frequency of 1542.684 MHz to mixer 64. The frequency is synthesized by phase locked loop techniques.

The local oscillator frequency is 1542.684 MHz, which is 32.736 MHz below the GPS signal frequency of 1575.42 MHz. The local oscillator frequency is generated with a phase locked synthesizer for frequency accuracy and stability. A reference frequency for the synthesizer is 8.184 MHz, which is divided by two and applied to the digitizers 90 and 94. The 8.184 MHz frequency reference is supplied by a high stability crystal oscillator 76. The synthesizer phase locks VCO 82 at 1542.684 MHz to the 8.184 MHz OSC 76. The VCO 82 may be implemented with a single transistor varactor tuned oscillator.

IF stages within GPS front-end 18 include filters 66 and 70 that set the receiver bandwidth to 1.3 MHz, amplifiers 68 and 72 to provide receiver gain and 90° phase shift network 73 to generate in-phase (I) and quadrature phase (Q) components. FIG. 1 shows two stages of IF filtering and two stages of IF gain. The first IF filter stage 66 rejects out-of-band signal energy before the high gain IF amplifier stages 68 and 72. The second IF filter stage 70 rejects out-of-band noise generated by the first IF amplifier stage 66. The filters may be realized with discrete inductors and capacitors. IF amplifiers 68 and 72 may comprise low-power single-transistor high-gain amplifiers with feedback-stabilized gains.

As shown in FIG. 1, the airborne digital hardware comprises the two low-cost comparator circuits for GPS signal digitization 90 and 94, the 5536-by-one bit memory 22 to store the GPS signal, the parallel-to-serial converter 28 and CRC generator 30 to encode the meteorological data: P, H and T. Serial digital data is used to modulate a downlink carrier in the 401–406 MHz meteorological band. The digital section is controlled by ROM based sequencer 36, which causes the collection of data on integer millisecond boundaries as timed by counter 37.

Downlink bit errors on the order of one in 1000 on the GPS data have little affect on the GPS accuracy since the GPS signal is received at −18 dB SNR. Therefore, the GPS signal already has many errors embedded within it. The correlation processing employed by the GPS signal processor extracts the pseudo-ranges even at low SNRs.

The ROM sequencer 36 may include an address generator and a ROM to control a sequence of operations of the airborne rawinsonde 12. The output of the ROM typically comprises multiple dedicated lines that control the timing of various operations. The ROM sequencer 36 must cause collections to start at integer number of milliseconds offset from the previous data collection to maintain user clock bias coherency.

Ground station 14 calculates navigation fixes, and collects time tags and stores the meteorological data on a hard disk included in PC 46. System 10 allows printing or monitoring of this data on a color monitor or printer 54. Ground station 14 hardware includes the digital card 50 which can simultaneously track up to three rawinsondes 12. The card has three independent channels, one channel for each rawinsonde 12. Receiver 40 may comprise a set of three commercial radios to receive three signals from rawinsondes 12 in the 400–406 MHz meteorological band. The receivers demodulate a rawinsonde 12 signal with a frequency modulation (FM) detector and twenty-five KHz bandwidth. A baseband FM signal is passed to digital hardware card 50, which resides in PC 46.

The digital card 50 interfaces the commercial meteorological band receivers 40, the "1-PPS" signal from GPS receiver 44 and the main bus of PC 46, which is preferably a Macintosh NuBus. A bit-synchronization circuit 100 comprises an edge detector and a digital PLL to track baud transitions.

A frame synchronizer 104 will search the input bit stream for a frame synchronization pattern. The frame synchronizer 104 may be a programmable array logic (PAL) design. Once a frame synchronization pattern is found, the frame synchronizer 104 checks if the pattern occurs in the same location within the frame for the next three frame times. If so, then frame lock is achieved. If the synchronization pattern is missed four consecutive times, then a loss of lock causes the re-synchronization search to be re-initiated.

The frame data is strobed into a FIFO memory 106 once frame synchronization is achieved. The data input to FIFO 106 also includes a GPS time of occurrence, e.g., the time of reception of the sync pattern. These are used by a navigation algorithm to determine the position of the GPS satellites at the time of collection.

The GPS time must be accurate to the millisecond, because of the high speed of the GPS satellites. A counter 108 onboard the digital card 50 helps keep accurate GPS time. GPS time counter 108 has GPS integer seconds, modulo 256, and fractional seconds, accurate to the millisecond. The GPS receiver 44 "1-PPS" signal is used to reset clock counter 108 at the beginning of each second epoch. Between epochs, an on-board oscillator can free-run to keep track of GPS time to an accuracy of one millisecond. When the next "1-PPS" epoch occurs, the fractional portion of timing counter 108 is reset and the seconds portion is incremented. The integer portion of GPS time counter 108 is initialized by a parallel interface bus. The GPS time to whole second accuracy is obtained by the GPS receiver 44 "message 21/41" packets. The data is transferred to the digital card 50 by a NuBus interface 110 and an interface control 112, which has a built-in interrupt driven NuBus slave interface. Software drivers are provided to high level languages such as "C".

One DSP accelerator card 48 is used for each channel of ground station 14, e.g., each tracked balloon. System may accommodate up to three DSP accelerator cards 48, which reside in PC 46 to accelerate pseudo-range extraction and navigation algorithm computations. Card 48 may comprise a model NB-DSP2300 from National Instruments, which is a Texas Instruments TMS320C30-based accelerator card designed for the NuBus. DSP accelerator 48 has a clock rate of thirty-three MHz and can perform thirty-three million floating point operations per second (MFLOPS). The card is purchased with 320 kilowords of memory and comes with two direct memory access (DMA) controllers. The DMAs are capable of thirty-three Mbytes/sec sustained data transfer rates between the Macintosh system memory and the DSP memory. The card allows up to four one-megaword windows into the NuBus address space. Interrupts are provided to and from PC 46 for processor-to-processor communications.

A two megabyte directly accessible, zero-wait state memory which is available on the NB-DSP2300 may be used to perform a 32,768-point fast Fourier transform of the received satellite signals. The memory can also be used for storing the Fourier transforms of the paradigms of the space vehicles that form the optimal four satellite constellation. Storage of the precomputed Fourier coefficients of the paradigm signal, along with the memory required for the computation of the fast Fourier transform and storage of twiddle factor coefficients, require slightly less than two megabytes. A single TMS320C30 processor can perform four pseudo-range extractions in 512 milliseconds. A single NB-DPS2300 card is thus capable of one navigation fix every second. The NB-DSP2300 may be programmed either in assembly or high-level language, e.g., the accelerator card programming may be done in C-language. Speed critical portions of the PRN code are preferably programmed in assembly language.

The Trimble Advanced Navigation Sensor (GPS receiver 44) is a six-channel GPS receiver that provides position, velocity, time and other information to external data terminals. TANS receiver 44 has three external connectors. A user must supply power, a GPS antenna and an RS-422 interface to communicate with the unit. The ground station uses GPS receiver 44 to extract ephemeris data and GPS time information. In differential operation, ground station 14 location computed by TANS receiver 44 is combined with the known surveyed position of ground station 14 antenna to compute differential corrections for the balloon location measurements. A highly accurate, one microsecond, "1-PPS" GPS time mark is used with the ephemeris data to compute the satellite locations.

Preferably, PC 46 is a Macintosh IIfx computer, which is based on a thirty-two bit Motorola 68030 processor with a forty MHz clock and a 68882 floating point coprocessor. The Macintosh IIfx comes with six NuBus expansion slots, two RS-422 serial ports, one SCSI port, one sound port and two Apple desktop bus ports. PC 46 is preferably equipped with four Mbytes of RAM, a 160 Mbyte hard disk and a SUPERDRIVE® floppy disk drive. PC 46 preferably includes a color monitor, such as a MacSync HC, and an extended keyboard and mouse. One of the serial interfaces is used to communicate with TANS receiver 44 receiver in order to obtain GPS time and ephemeris data. Another serial interface is used to communicate with printer 54. An additional RS-422 port is provided to communicate with the meteorological receiver 40.

Macintosh IIfx computers come standard with two RS-422 interfaces. Ground station 14 require three such interfaces, one for TANS receiver 44, one for printer 54 and one for meteorological band receiver 40. Card 52 may comprise a commercially available RS-422 expansion slot card to fulfill these needs.

A user interface is developed using the Macintosh user interface guidelines, as published by Apple Computer. A main menu includes a set of pull down menus, a map area and a balloon status area.

The first two pull down menus are basic Macintosh FILE and EDIT menus. The next set of three menus are application specific. A main map is located directly below a menu bar. An area depicts a location of up to three rawinsondes 12 with arrows that indicate a (compass) direction of movement and a length proportional to the rawinsonde speed, e.g., wind speed. The map is the main display and is preferably shown at all times, except in graph or table modes. A weather balloon status area numerically displays a set of locations for up to three balloons, along with their respective meteorological data and status.

Although the present invention has been described in terms of the presently preferred embodiments, it is to be understood that the disclosure is not to be interpreted as limiting. Various alterations and modifications no doubt become apparent to those skilled in the art after having read the above disclosure. Accordingly, it is intended that the appended claims are interpreted as covering all alterations and modifications as fall within the true spirit and scope of the invention.

What is claimed is:

1. A two-part system for navigation solution determination of tile position of a remote mobile sensor in receipt of transmissions from orbiting navigation satellites and in communication with a main station, comprising:

a microwave signal downconverter disposed in said remote mobile sensor and in a first part of said two-Dart system with means for receiving signals from said orbiting navigation satellites visible to said remote mobile sensor;

timing means connected to the microwave signal downconverter for establishing coherency of a user clock bias associated with said received orbiting navigation satellite signals wherein the starting points of collection and transmission of data from the microwave signal downconverter are synchronized to occur at integer multiples of a code epoch of said orbiting navigation satellite signals with a constant user clock bias;

main station navigation processing means disposed in a second part of said two-part system and independent from said first part and connected to remotely receive down converted signals from the microwave downconverter means and a coherent user clock from the timing means for computing navigation solutions of the position of said first part from data periodically received from said remote mobile sensor; and a Kalman filter connected to the main station GPS processing means for accurately estimating and removing said user clock bias.

2. The system of claim 1, wherein:

the Kalman filter uses said user clock bias coherency in averaging positional estimates and wherein such coherency allows navigation updates with reduced GPS satellite constellations due to adverse random motion of said remote mobile sensor that affects reception of GPS signals from less than all said GPS satellites visible at any one instant, said updates enabled by setting a corresponding element of an R-matrix of blocked satellites to relatively large values.

3. The system of claim 1, wherein:

the Kalman filter includes outputs for position and velocity estimates derived over several seconds of observation.

4. The system of claim 1, wherein:

the Kalman filter has outputs for instantaneous performance measures including estimated position and velocity variance.

5. An expendable mobile remote sensor for GPS determination of the remote sensor position by a ground station, the sensor comprising:

GPS downconverter means for receiving a plurality of GPS signals from GPS satellites and for outputting an in-phase (I) intermediate frequency (IF) signal;

a ninety-degree phase shifter for generating a quadrature-phase (Q) IF signal from said in-phase intermediate frequency signal;

dual single-bit digitizer means for simultaneously sampling said in-phase intermediate frequency and quadrature-phase intermediate frequency at a first bit rate to produce corresponding in-phase sample and quadrature-phase sample serial signal outputs;

buffering means for organizing said In-phase samples and said quadrature-phase samples serial signals into a serial data stream having a second bit rate; and radio transmitter means for periodically broadcasting said serial data stream.

6. The sensor of claim 5, wherein:
the GPS downconverter means includes filtering means for producing a receiver bandwidth of approximately 1.3 MHz with a relatively low group delay variation; and
the ninety-degree phase shifter has a substantially constant phase shift over the bandwidth of the GPS downconverter.

7. The sensor of claim 5, wherein:
the dual single-bit digitizer means comprises for each channel of the in-phase and quadrature-phase sampling a comparator which drives a D-type latch clocked at said first rate.

8. The sensor of claim 5, wherein:
the GPS downconverter means includes filtering means for producing a receiver bandwidth of approximately 1.3 MHz with a relatively low group delay variation;
the ninety-degree phase shifter has a substantially constant phase shift over the bandwidth of the GPS downconverter; and
the dual single-bit digitizer means comprises for each channel of the in-phase and quadrature-phase sampling a comparator which drives a D-type latch clocked at said first rate which is approximately four MHz.

9. A mobile remote sensing system with GPS determination of the remote sensor position by a system ground station, the system comprising:
GPS downconverter means for receiving a plurality of GPS signals from GPS satellites and for outputting an in-phase intermediate frequency (IF) signal;
a ninety-degree phase shifter for generating a quadrature-phase IF signal from said in-phase intermediate frequency signal;
dual single-bit digitizer means for simultaneously sampling said in-phase intermediate frequency and quadrature-phase intermediate frequency at a first bit rate to produce corresponding in-phase sample and quadrature-phase sample serial signal outputs;
buffering means for organizing said in-phase samples and said quadrature-phase samples into a serial data stream having a second bit rate; and
radio transmitter means for periodically broadcasting said serial data stream;
meteorological measuring instrument means for periodically testing an ambient atmosphere and for outputting a serial digital signal comprising information related to said tests; and
frame formatting means for combining said meteorological information serial digital signal in meteorological words with said in-phase sample and a quadrature-phase sample pair of serial outputs for periodic transmission to said ground support station by the radio transmitter means.

10. The system of claim 9, further comprising said ground station which includes:
GPS receiver means for obtaining ephemeris, clock and almanac information directly from a constellation of GPS satellites in view for said remote sensor;
radio means for receiving said broadcasts of said serial data stream; and
computer means for determining a position of said remote sensor from information derived from said serial data stream and said ephemeris, clock and almanac information.

11. The system of claim 10, wherein:
the GPS receiver means further includes GPS positioning determination means wherein a differential correction may be applied to a computed position of said remote sensor by comparing a computed position for said ground station to a previously determined actual position for said ground station.

12. A rawinsonde for GPS position determination support by a ground station, comprising:
balloon means for carrying the rawinsonde aloft in the atmosphere in a free-flight;
GPS downconverter means for receiving a plurality of GPS signals from GPS satellites and for outputting an in-phase (I) and a quadrature-phase (Q) intermediate frequency (IF) pair of signals comprising pseudo-random number (PRN) code division multiple access (C/A) information;
single-bit digitizer means for sampling said in-phase intermediate frequency and quadrature-phase intermediate frequency at a first rate to produce an in-phase sample and a quadrature-phase sample pair of serial outputs;
meteorological measuring instrument means for periodically testing said atmosphere and for outputting a signal comprising information related to said tests;
frame formatting means for combining said meteorological information signal with said in-phase sample and a quadrature-phase sample pair of serial outputs; and
radio transmitter means for periodically broadcasting said frame formatted signals including said in-phase sample and a quadrature-phase sample pair of serial outputs and said meteorological information signal.

* * * * *